(12) United States Patent
Yen et al.

(10) Patent No.: US 8,027,536 B2
(45) Date of Patent: Sep. 27, 2011

(54) SYSTEM AND METHOD FOR IMAGE FOG SCENE DETECTION

(75) Inventors: Jonathan Yen, San Jose, CA (US); William C. Kress, Vista, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1055 days.

(21) Appl. No.: 11/851,160

(22) Filed: Sep. 6, 2007

(65) Prior Publication Data

US 2009/0067714 A1 Mar. 12, 2009

(51) Int. Cl.
*G06K 9/34* (2006.01)
(52) U.S. Cl. ........................................................ 382/173
(58) Field of Classification Search .................. 382/168, 382/170, 172, 173, 181, 218–219, 254
See application file for complete search history.

(56) References Cited

U.S. PATENT DOCUMENTS

| 7,668,369 | B2 * | 2/2010 | Yen et al. | 382/170 |
| 2007/0297673 | A1 * | 12/2007 | Yen et al. | 382/173 |

* cited by examiner

*Primary Examiner* — Duy M Dang
(74) *Attorney, Agent, or Firm* — SoCal IP Law Group LLP; Steven C. Sereboff; Jonathan Pearce

(57) ABSTRACT

The subject application is directed to a system and method for image fog scene detection. Electronic image data is first received and divided into image regions, with each region consisting of a plurality of pixels. Next, a comparison matrix is generated corresponding to each image region based upon a comparison of minimum intensity values associated with corresponding pixels to a threshold value. An entry of at least one of the comparison matrices is then tested for a preselected value. The received electronic image data is then identified as inclusive of a fog scene based upon the output of the test on the entry of the comparison matrix. Based upon the identification, fog scene detection data representing an identified fog scene is then generated.

20 Claims, 12 Drawing Sheets
(3 of 12 Drawing Sheet(s) Filed in Color)

| 81 | 87 | 91 | 118 | 129 |
|----|----|----|-----|-----|
| 55 | 44 | 66 | 103 | 125 |
| 51 | 42 | 50 | 70  | 110 |
| 47 | 42 | 42 | 63  | 70  |
| 42 | 40 | 45 | 47  | 51  |

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

```
158  166  127  138  148
151  109  105  118  123
 95   92   92   92   95
  2    5    2    0    8
  0    0    0    0    0
```

```
1 1 1 1 1
1 1 1 1 1
1 1 1 1 1
0 0 0 0 0
0 0 0 0 0
```

SYSTEM AND METHOD FOR IMAGE FOG SCENE DETECTION

BACKGROUND OF THE INVENTION

The subject application is directed generally to enhancement of electronic images, and is particularly directed to detection of images inclusive of a fog scene component.

Many images that are captured, particularly photographic images, include some or all of an associated scene having fog associated with it. Such a fog tends to soften or obscure some or all of the underlying image. Fog may be attributed to natural occurring characteristics of a captured scene, such as when taken at dusk, during an overcast day, or while it is raining. Still other fog characteristics may be attributed to properties of photosensitive emulsions, positioning of illumination sources, or extraneous light. Fog in an image may also be introduced by media storage considerations, such as by chemical interaction, passage of time, exposure to heat, and the like.

Many captured images are either captured as digital images, such as with a digital camera. Others are captured in a more traditional manner, such as with photographic film. With film, digitization is frequently employed to facilitate long term storage to readily allow transmission or printing. In either situation, electronic images are obtained which have fog scene information encoded therein, and which fog scene information will ultimately work to obscure or degrade resultant images that are rendered or displayed.

Earlier systems sought to detect fog scenes, and solutions have been isolated which work on color images. Such systems detect disparities between averages of components, such as red, green, and blue color planes.

SUMMARY OF THE INVENTION

In accordance with one embodiment of the subject application, there is provided a system and method for enhancement of electronic images.

Further, in accordance with one embodiment of the subject application, there is provided a system and method for detection of images having a fog scene component.

Still further, in accordance with one embodiment of the subject application, there is provided a system for image fog scene detection. The system is comprised of means adapted for receiving electronic image data and segmentation means adapted for dividing received electronic image data into a plurality of image regions, each image region being comprised of a plurality of pixels. The system is further comprised of comparison means adapted for generating a comparison matrix corresponding to each image region in accordance with a comparison of minimum intensity values associated with corresponding pixels to a threshold value and testing means adapted for testing an entry of at least one comparison matrix for a preselected value. The system also includes identifying means for identifying received electronic image data inclusive of a fog scene in accordance with an output of the testing means and means adapted for generating fog scene detection data representative of an identified fog scene in accordance with an output of the identifying means.

In one embodiment of the subject application, the testing means further comprises means adapted for generating count data corresponding to each comparison matrix inclusive of an entry which includes the preselected value. In such embodiment, the identifying means includes means adapted for identifying received electronic image data in accordance with generated count data.

In another embodiment of the subject application, the system further comprises means adapted for receiving histogram data corresponding to a data representative of fog scene characteristics. In such embodiment, the comparison means includes means adapted for generating each comparison matrix in accordance with a comparison of minimum intensity values in accordance with received histogram data. Preferably, the histogram data includes data associated with at least one of minimum image component value, modified minimum image component value, and black point analysis on previously received image data.

In yet another embodiment of the subject application, the system also comprises means adapted for receiving fog scene threshold data corresponding to a desired threshold for fog scene detection. In this embodiment, the identifying means further includes means adapted for identifying received electronic image data in accordance with received threshold data. Preferably, the threshold data corresponds to an output of an associated image enhancement system. Preferably, the associated image enhancement system is at least one of a white balance adjustment system and an automatic darkening system.

Still further, in accordance with one embodiment of the subject application, there is provided a method for fog scene detection in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject application is described with reference to certain figures, including.

DETAILED DESCRIPTION OF THE PREFERRED EMBODIMENT

The subject application is directed to a system and method for enhancement of electronic images. In particular, the subject application is directed to a system and method for detection of images having a fog scene component. More particularly, the subject application is directed to a system and method for fog scene detection for automatic image quality improvement. It will become apparent to those skilled in the art that the system and method described herein are suitably adapted to a plurality of varying electronic fields employing image manipulation, including, for example and without limitation, communications, general computing, data processing, document processing, photographic processing, or the like. The preferred embodiment, as depicted in FIG. 1, illustrates a document processing field for example purposes only and is not a limitation of the subject application solely to such a field.

Figure 1:
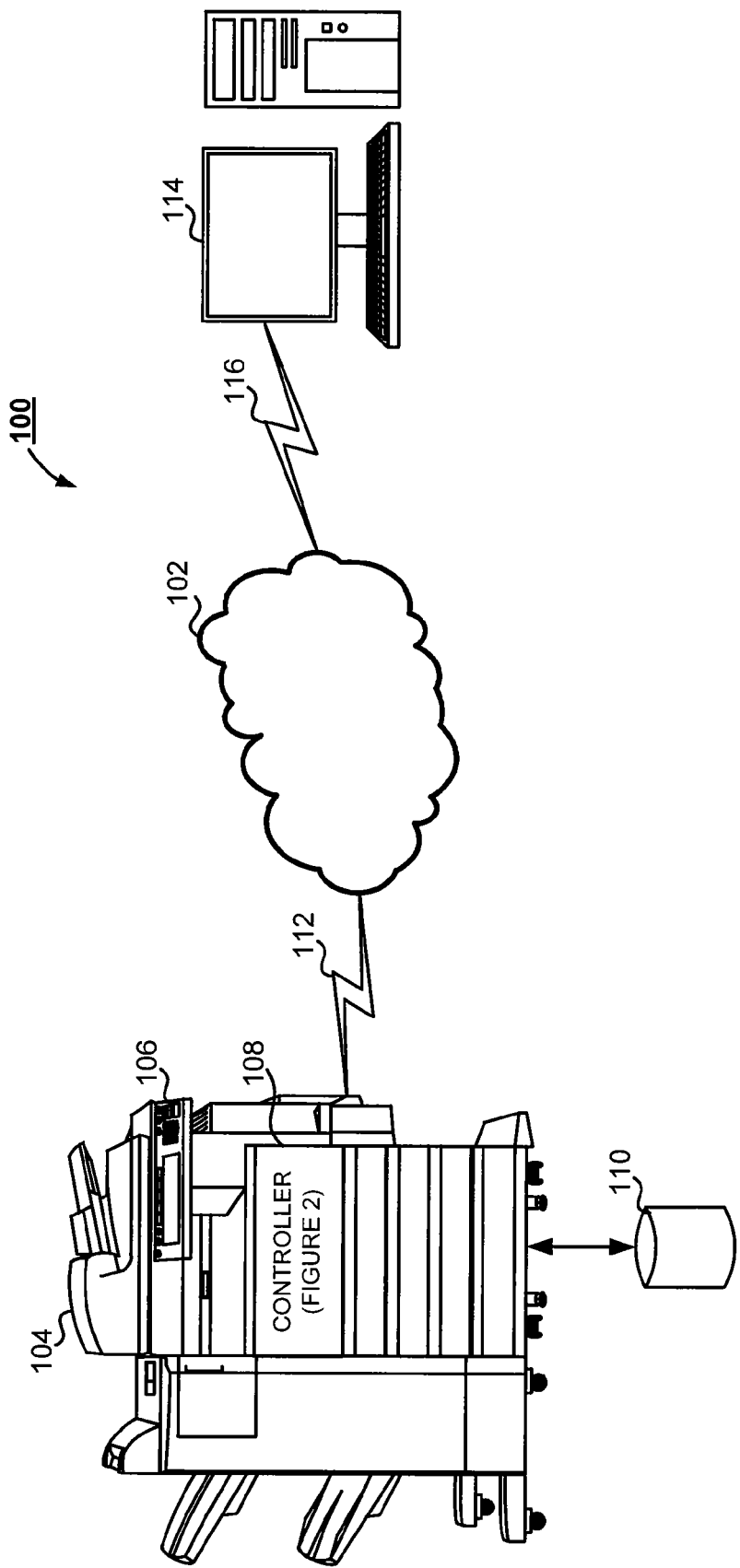
FIG. 1 is an overall diagram of a system for image fog scene detection according to one embodiment of the subject application.

Referring now to FIG. 1, there is shown an overall diagram of a system 100 for image fog scene detection in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for image fog scene detection of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 116. It will be appreciated by those skilled in the art that the user device 114 is shown in FIG. 1 as a computer workstation for illustration purposes only. As will be understood by those skilled in the art, the user device 114 is representative of any personal computing device known in the art, including, for example and without limitation, a laptop computer, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

Figure 2:
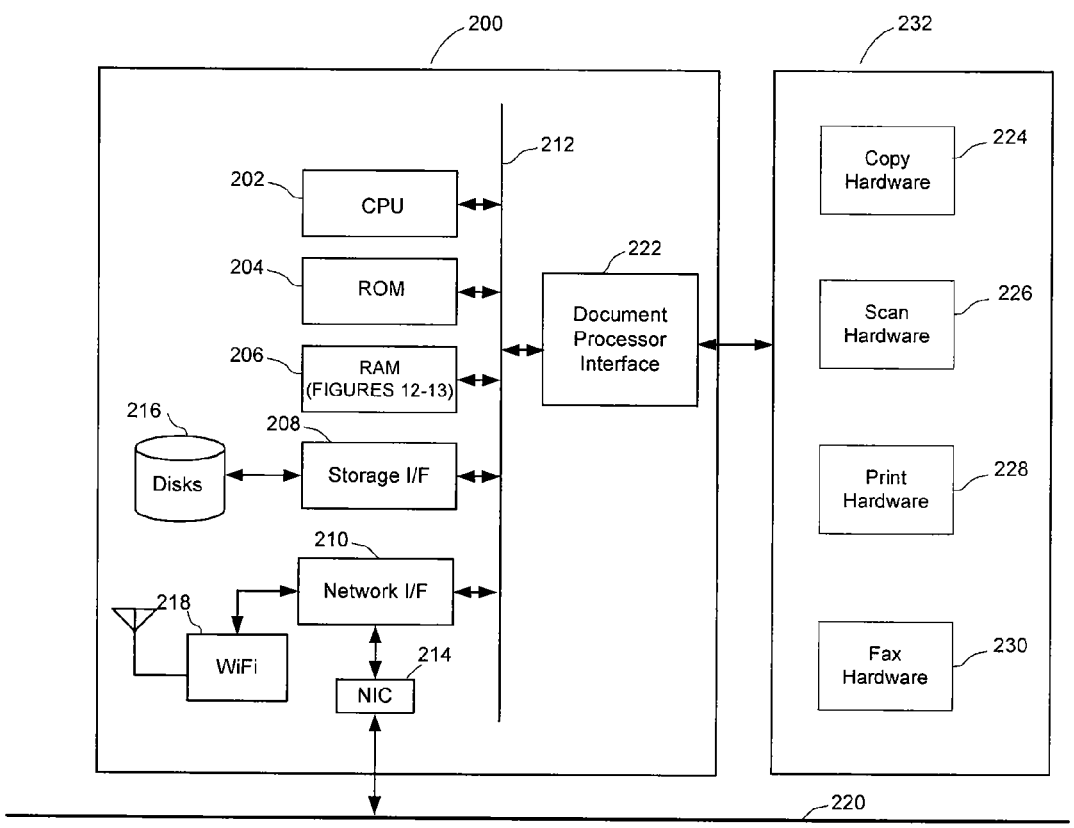
FIG. 2 is a block diagram illustrating controller hardware for use in the system for image fog scene detection according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
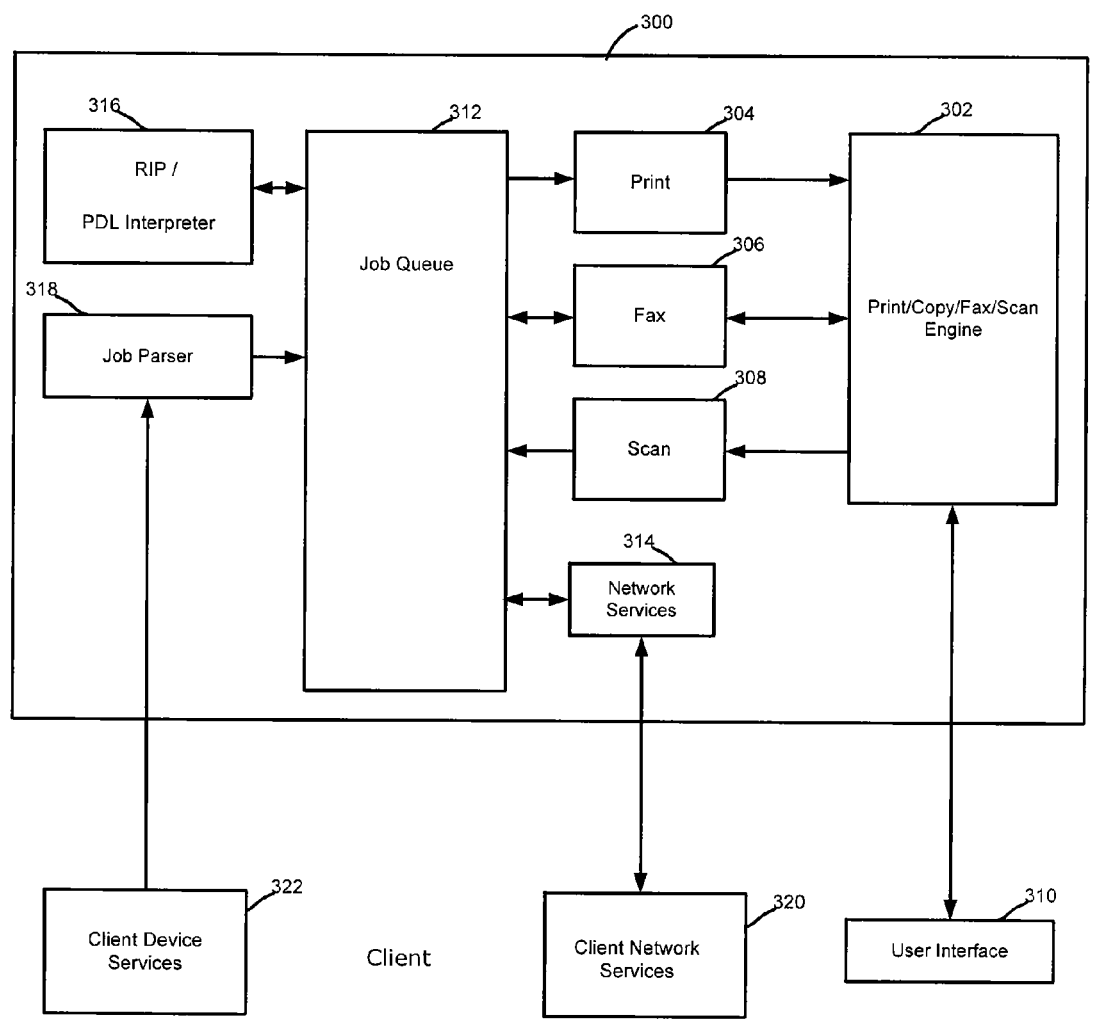
FIG. 3 is a functional diagram illustrating the controller for use in the system for image fog scene detection according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
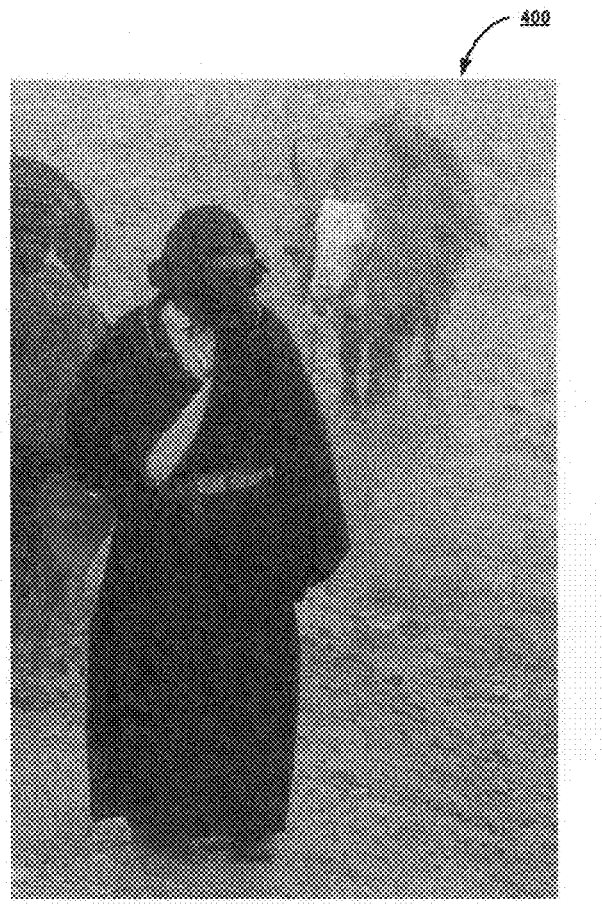
FIG. 4 is an example input image depicting a fog scene image associated with the system for image fog scene detection according to one embodiment of the subject application.
Figure 5:
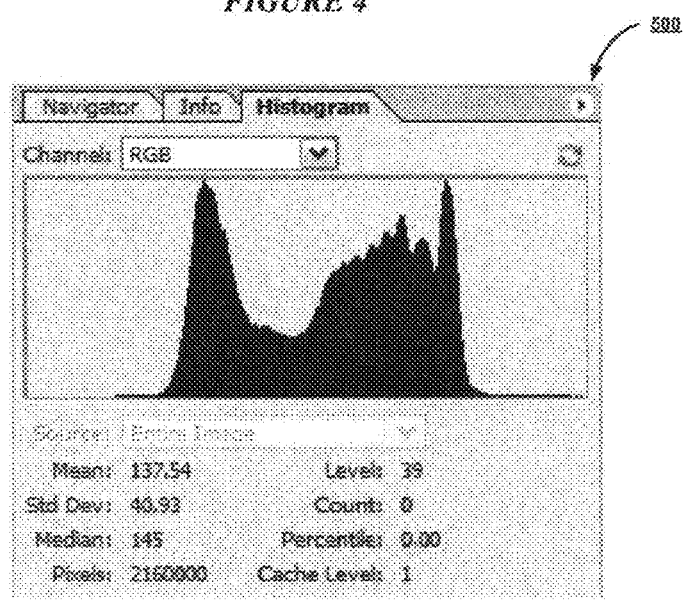
FIG. 5 is an example Red, Green, Blue histogram associated with the example input image of FIG. 4.

Turning now to FIG. 4, there is shown an example input image 400 for fog scene detection in accordance with one embodiment of the subject application. As shown in FIG. 4, the input image 400 depicts a fog scene, the analysis and detection of which will become apparent in accordance with the methodologies described hereinbelow. The skilled artisan will appreciate that while illustrated hereinafter as applicable to color images, the subject application is also capable of being applied to non-color, e.g., monochromatic, images. Furthermore, the skilled artisan will also appreciate that the subject application is capable of being applied to digital images in any color or monochromatic space including, for example and without limitation, RGB, Grayscale, L*a*b*, XYZ, CMYK, Hi-Fi color (e.g., greater than four component), and the like. Thus, while reference is made hereinafter to RGB color space image fog scene detection, it will be apparent to those skilled in the art that the subject application is also capable of implementation for the detection of fog scenes in any other color or monochromatic space image. With respect to FIG. 5, there is shown a histogram 500 illustrating Red, Green, Blue (RGB) intensity values associated with the image shown in FIG. 4. As will be understood by those skilled in the art, the histogram 500 typically has a significantly high level of the first non-zero count, i.e., the number of pixels, for all levels below 40, are all zero. In accordance with one embodiment of the subject application, the system and method described herein enables the capture of the histogram characteristics of a fog scene, e.g., the histogram, such as that shown in FIG. 5, has a significantly high level of the first non-zero count, wherein all levels below 40 are zero.

Figure 6:
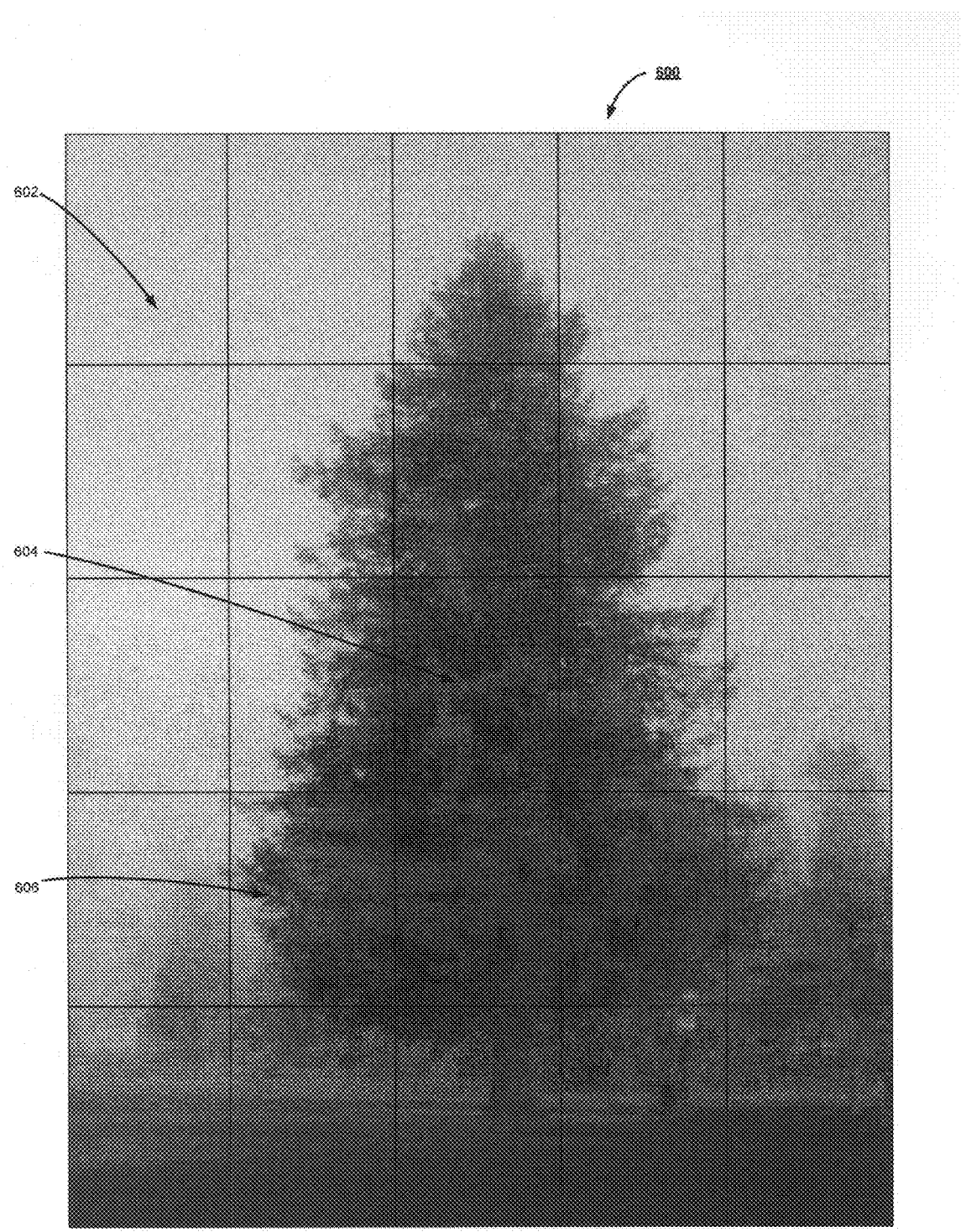
FIG. 6 is an illustration of an image partitioned in accordance with the system for image fog scene detection according to one embodiment of the subject application.
Figure 7:
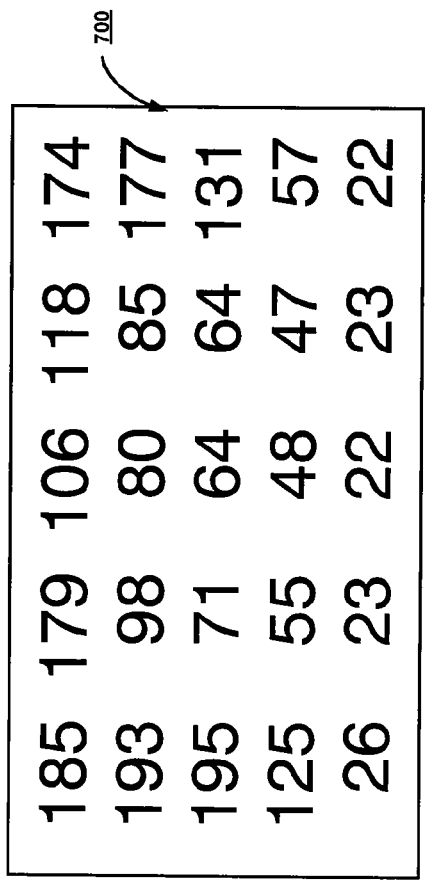
FIG. 7 is an illustration of an M×N matrix depicting code values of the image of FIG. 6 according to one embodiment of the subject application.

Referring now to FIG. 6, there is shown an example input image partitioned into M×N regions, e.g., 5 by 5, as shown by the image 600. The input image 600 includes a plurality of peripheral regions 602, a center region 604, and a plurality of central regions 606, which include all regions except the center region 604 and the peripheral regions 602. A code value chart, or matrix, corresponding to the M×N regions of the image 600, is then generated via the calculation of the minimum image component code value for each region, e.g., regions 602, 604, and 606. For example, and without limitation, the minimum RGB code value is calculated for each color plane, minimum-R in red, minimum-G in green, and minimum-B in blue, with a minimum value calculated as the minimum of minimum-R, minimum-G, and minimum-B. Stated another way, the minimum code value of each region is calculated via the lowest level of count greater than zero (count>0). FIG. 7 illustrates a minimum code value chart, or matrix, 700 corresponding to the calculated minimum code values of the image 600 shown in FIG. 6.

It will be appreciated by those skilled in the art that other methods for generating the image component code value chart 700 of FIG. 7 are capable of being used in addition to the minimum RGB value methodology. For example, calculating the lowest level of count greater than P (count>P), where P represents a preselected percentage, for example 0.05%, of the total number of pixels in the input image, e.g., a modified minimum image component value approach. An additional method to populate the code value chart 700 includes the calculation of the minimum image component code value of the black point for each region, as will be understood by those skilled in the art. That is, the black point approach involves the locating of the pixel in each region having the minimum luminance (also the one with the lowest chrominance if more than one pixel have the same minimum luminance value). Other methodology for determining code values are based upon the color or monochromatic space of the image being analyzed and are capable of implementation in accordance with the subject application.

Figure 8:
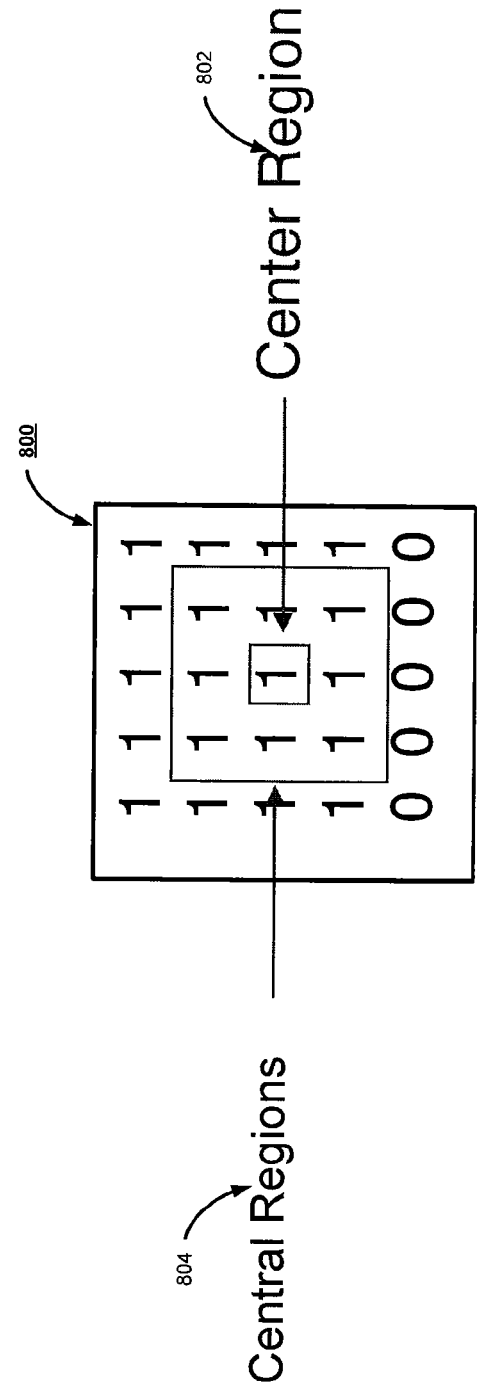
FIG. 8 is an illustration of a binary M×N matrix associated with the code values of FIGS. 6 and 7 according to one embodiment of the subject application.

A threshold value is obtained a priori by an optimization process, including, for example and without limitation, via plotting the Receiver Operator Characteristic curve, as will become apparent to those skilled in the art. The determined threshold value is applied to the code value chart 700 so as to provide a binary M×N matrix, e.g., 1 for those RGB code values above the threshold value and 0 for those RGB code values below the threshold value. FIG. 8 illustrates a binary chart 800 corresponding to the application of the threshold value to the image component code value, e.g., the RGB, chart 700 of FIG. 7. The center region 802, corresponding to the center region 604, is then defined in the chart 800, along with all central regions 804, corresponding to the central regions 606. As stated above, the central regions 804 include all regions other than the peripheral regions.

According to one example embodiment of the subject application, following determination of the regions 602-606, e.g., center region 802 and central regions 804 of FIG. 8, a majority rule is established. For example and without limitation, when the center region 802 (shown in FIG. 6 as the region 604) is not a 1, based upon the binary M×N chart 800 illustrated in FIG. 8, a determination is made that the image being analyzed is not a fog scene. The chart 700 corresponding to the image 600 of FIG. 6 indicates that the center region 604 (802) does equal 1. When the center region 802 (shown in FIG. 6 as the region 604) does equal 1, a determination is then made whether a strong majority, e.g., 90%, of the central regions 804 (shown in FIG. 6 as the regions 606) have threshold applied values equivalent to 1. If such a strong majority does have threshold applied values corresponding to 1, a determination is made that the image, e.g., the image 600, is a fog scene. When no strong majority exists, a determination is then made whether a majority, e.g., 60%, of the central regions 804 have threshold applied values of 1. In the event that a majority of the central regions 804 have threshold applied values of 1, a determination is made that the image 600 is a partial fog scene. When no majority of central regions 804 are determined to have threshold applied values of 1, based upon the binary M×N chart 800, a determination is made that the scene depicted in the image 600 is not a fog scene.

In operation, electronic image data is first received and divided into a plurality of image regions, with each region comprised of a plurality of pixels. A comparison matrix is then generated corresponding to each image region based upon a comparison of minimum intensity values associated with corresponding pixels to a threshold value. An entry of at least one of the comparison matrices is then tested for a preselected value. The received electronic image data is then identified as inclusive of a fog scene based upon the output of the test on the entry of the comparison matrix. Based upon the identification, fog scene detection data representing an identified fog scene is then generated.

In accordance with one example embodiment of the subject application, electronic image data is first received by the controller 108 or other suitable component associated with the document processing device 104, such as the image data illustrated in FIGS. 4 and 6 discussed above, and in FIGS. 9A-11C, discussed in greater detail below. It will be appreciated by those skilled in the art that while reference is made herein with respect to the document processing device 104 implementing the subject application, it will be understood that any suitable computing device capable of image processing, such as, for example and without limitation, the user device 114, is capable of being used in accordance with the subject application.

The received electronic image data is then divided into a plurality of image regions, with each image region being comprised of a plurality of pixels. A suitable example of the division of a received electronic image is shown in FIG. 6, as described above. Histogram data corresponding to data representative of fog scene characteristics is then received by the controller 108 or other suitable component associated with the document processing device 104. In accordance with one embodiment of the subject application, the histogram data includes data associated with minimum RGB, modified minimum RGB, black point analysis on previously received image data, Grayscale, YCC, XYZ, L*a*b*, CMYK, Hi-Fi, or other color or monochromatic space parameters, as will be understood by those skilled in the art. A suitable example of such histogram data is illustrated in FIG. 4, as discussed previously.

The controller 108 or other suitable component associated with the document processing device 104 then receives fog scene threshold data corresponding to a desired threshold for fog scene detection. It will be appreciated by those skilled in the art that the threshold data is capable of corresponding, for example and without limitation, to the output of an image enhancement system, such as, without limitation, a white balance adjustment system, an automatic darkening system, and the like. A comparison matrix is then generated for each region according to a comparison of minimum intensity values associated with corresponding pixels to the threshold value. Thus, the skilled artisan will appreciate that the comparison matrix is capable of being generated in accordance with a comparison of minimum intensity values according to the received histogram data. Suitable examples of such comparison matrices are illustrated in FIG. 8 discussed above and FIGS. 9C, 10C, and 11C, described in greater below.

An entry of a comparison matrix is then tested by the controller 108 or other suitable component associated with the document processing device 104 for a preselected value. Thereafter, count data is generated corresponding to each comparison matrix inclusive of an entry which includes the preselected value. The received electronic image data is then identified by the controller 108 or other suitable component associated with the document processing device 104 as inclusive of a fog scene based upon the results of the tested entry. It will be appreciated by those skilled in the art that the identification of the received electronic image as a fog scene image is capable of being made in accordance with the generated count data, referenced in greater detail herein. Following the identification of the image as a fog scene, the controller 108 or other suitable component associated with the document processing device 104 generates fog scene detection data representing an identified fog scene image.

According to a further example embodiment of the subject application, image data is received by the document processing device 104 via any suitable means. For example, an electronic image is transmitted from the user device 114 to the document processing device 104 via the computer network 102, generated by the document processing device 104 via operations thereof, or the like. Examples of such images are shown in FIGS. 4, 6, 9A, 10A, and 11A. The received electronic image is then partitioned in M×N regions, with each region comprising a plurality of pixels. An example of the partitioning of an image in accordance with such an embodiment of the subject application is depicted in FIG. 6, wherein the image 600 is partitioned into 5×5 regions. The controller 108 or other suitable component associated with the document processing device 104 then determines the minimum image component code values for each of the M×N regions. The minimum image component code values are then translated into an M×N matrix, or a minimum code value chart, such as that illustrated in FIGS. 7, 9B, 10B, and 11B. For example, FIG. 7 depicts a suitable minimum code value chart 700 corresponding to the 5×5 regions of FIG. 6, thus giving a resultant 5×5 matrix. Reference, for purposes of example with respect to this embodiment, is made hereinafter to the image and matrices of FIGS. 6-7. The skilled artisan will appreciate that other methods of generating such minimum code value charts are capable of being used including, for example and without limitation, those methods discussed in greater detail above.

A threshold value is determined a priori by an optimization process, as described in detail above. The threshold value is applied to each minimum RGB code value in the M×N matrix 700. Thereafter, a binary M×N matrix 800 is generated corresponding to the application of the threshold value to the minimum RGB code value. That is, the binary M×N matrix 800, illustrated in FIG. 8, corresponds to the application of a threshold value, the M×N matrix 700 of FIG. 7 with respect to the image 600 of FIG. 6. For example, those minimum RGB code values in the M×N matrix 700 having a value greater than the threshold value are assigned a 1 and those code values in the M×N matrix 700 having a value less than the threshold value are assigned a zero. It will be appreciated by those skilled in the art that those values equal to the threshold value are capable of either being assigned a 1 or a 0, depending upon the settings of the subject application as selected by an associated user of the document processing device 104.

The controller 108 or other suitable component associated with the document processing device 104 then defines the center region of the binary M×N matrix 800, depicted in FIG. 8 at 802. The skilled artisan will appreciate that the center region of the binary M×N matrix 800 corresponds to the center region 604 of the associated image (as shown in FIG. 6). The central regions (shown in FIG. 8 as the regions 804) of the binary M×N matrix 800 (corresponding to the central regions 606 of FIG. 6) are then defined by the controller 108 or other suitable component associated with the document processing device 104.

Using the defined regions and associated values of the generated M×N binary matrix 800, the controller 108 then determines whether the center region 802 has an applied threshold value equal to 1. When the center region 802 is not equal to 1, i.e., the center region 802 is a 0, the image 600 associated with the M×N binary matrix 800 is classified as a non-fog scene. As shown in FIG. 8, the center region 802 includes a 1, which prompts the controller 108 to determine whether a strong majority of the central regions 804, for example 90%, have binary M×N matrix values equivalent to 1. When a strong majority of the central regions 804 have values corresponding to 1, the image 600 is then classified as a fog scene image. When a strong majority of the central regions 804 do not have values equivalent to 1, the controller 108 then determines whether a majority of the central regions 804, e.g., 60%, have values of 1. When a majority of the central regions 804 do not have values of 1, the image 600 is classified as a non-fog scene image. When a majority of the central regions 804 do have values of 1, as a result of the application of the threshold value set forth above, the controller 108 or other suitable component associated with the document processing device 104 classifies the image 600 as a partial fog scene image.

Figures 9A, 9B, 9C:
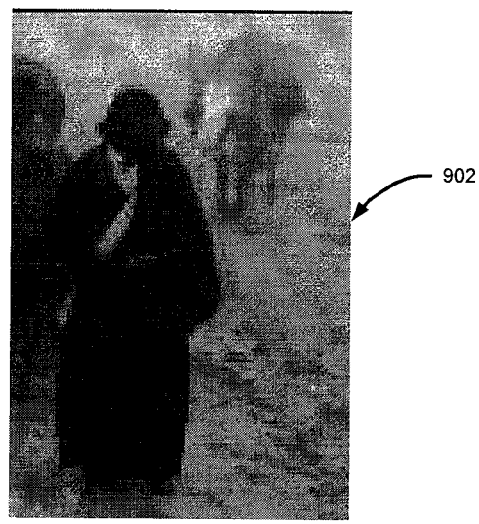
FIG. 9A is an example input image corresponding to a fog scene.
FIG. 9B is an M×N matrix depicting code values corresponding to FIG. 9A.
FIG. 9C is a binary M×N matrix depicting applied threshold values to the matrix of FIG. 9B.

For example, FIG. 9A illustrates an RGB fog scene image 902 which is received by the document processing device 104 in accordance with one embodiment of the subject application. An RGB code value chart 904, illustrated in FIG. 9B, is then generated by the controller 108 or other suitable component associated with the document processing device 104. A threshold value is determined a priori in accordance with the methodology described herein and applied to the chart 904 to produce the binary chart 906 depicted in FIG. 9C. Thereafter, the controller 108 or other suitable component associated with the document processing device 104 applies the majority rules described above to determine whether the scene 902 corresponds to a fog scene. Thus, the center region of the image 902, based upon the binary chart 906, is determined to equal 1 and a strong majority of the central regions equal 1. The controller 108 then identifies the image 902 as a fog scene image.

Figures 10A, 10B, 10C:
FIG. 10A is an example input image corresponding to a partial fog scene.
FIG. 10B is an M×N matrix depicting code values corresponding to FIG. 10A.
FIG. 10C is a binary M×N matrix depicting applied threshold values to the matrix of FIG. 10B.

Another example is illustrated in FIG. 10A, which includes the RGB image 1002. The controller 108 or other suitable component associated with the document processing device 104 then generates a suitable M×N RGB code value chart 1004, illustrated in FIG. 10B. The controller 108 obtains a threshold value determined a priori, which is applied to the chart 1004. An M×N binary chart 1006, illustrated in FIG. 10C, is then generated in accordance with the application of the threshold value to the RGB chart 1004. The controller 108 or other suitable component associated with the document processing device 104 then analyzes the binary chart 1006 to determine whether the scene 1002 is a fog scene, a partial fog scene, or not a fog scene. Thus, as the center region of the scene 1002 corresponds to 1, but only a majority of the central regions are 1, the controller 108 identifies the scene 1002 as a partial fog scene image.

Figure 11A:
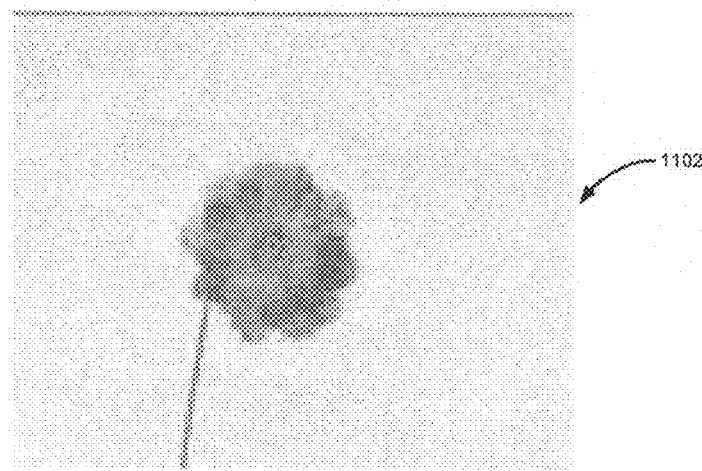
FIG. 11A is an example input image corresponding to a non-fog scene.
Figure 11B:
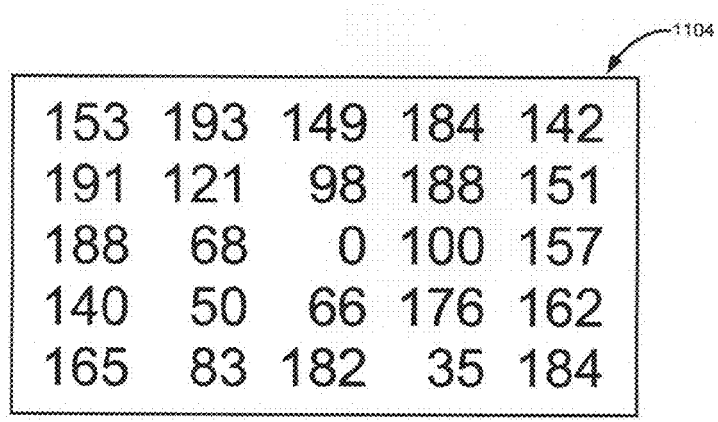
FIG. 11B is an M×N matrix depicting code values corresponding to FIG. 11A.
Figure 11C:
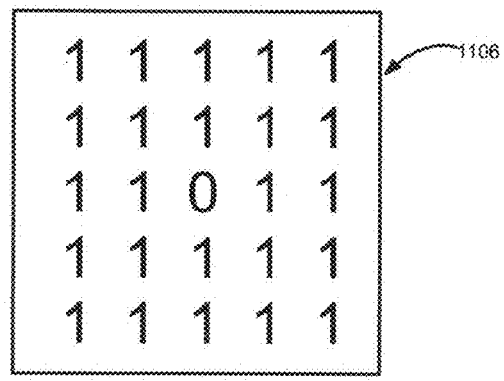
FIG. 11C is a binary M×N matrix depicting applied threshold values to the matrix of FIG. 11B.

As a further example, FIG. 11A depicts an RGB image 1102, from which an M×N RGB code value chart 1104 is generated by the controller 108 or other suitable component associated with the document processing device 104, as shown in FIG. 11B. A threshold value is determined a priori and applied to the M×N RGB code value chart 1104, resulting in the output of an M×N binary chart 1106, as shown in FIG. 11C. The M×N binary chart 1106 of FIG. 11C is then analyzed as set forth above. The controller 108, or other suitable component associated with the document processing device 104, then determines, based upon the chart 1106, whether the scene 1102 corresponds to a fog scene, a partial fog scene, or a non-fog scene. As the center region of the chart 1106 is 0, the controller 108 identifies the image 1102 as a non-fog scene image.

Figure 12:
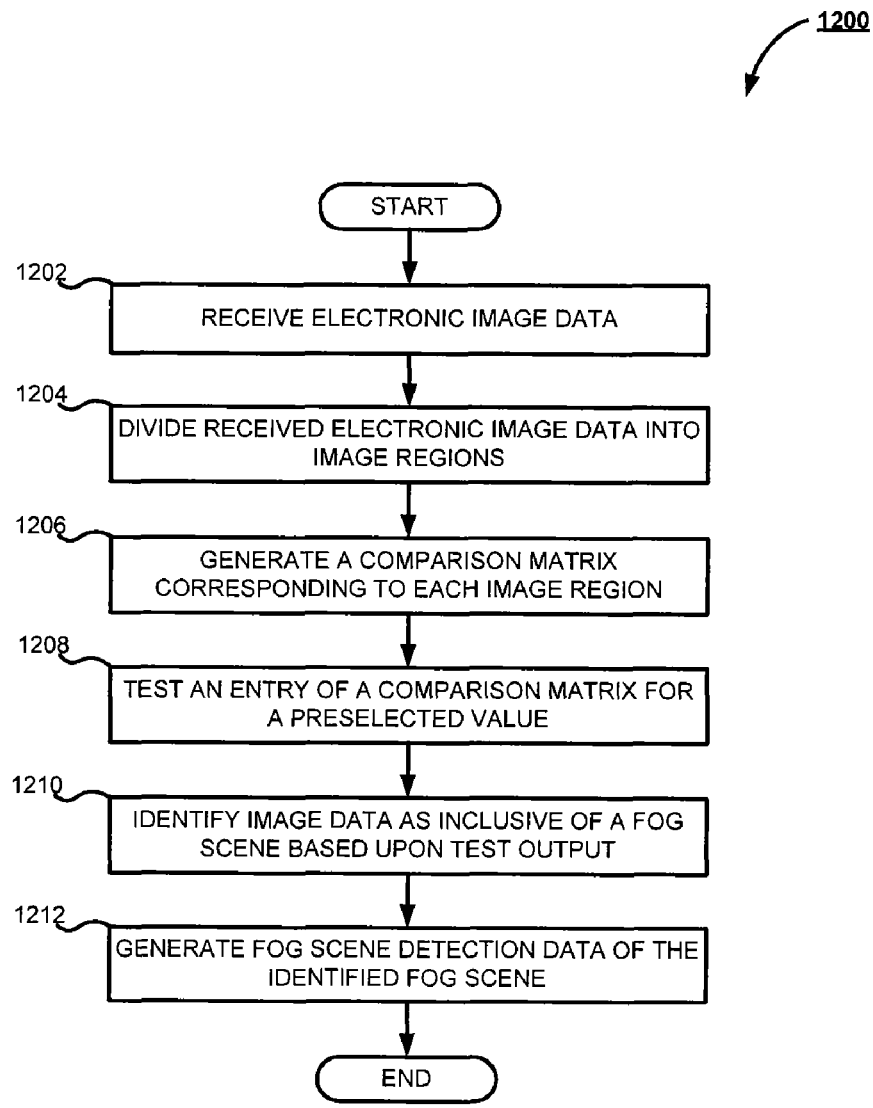
FIG. 12 is a flowchart illustrating a method for image fog scene detection according to one embodiment of the subject application.

The skilled artisan will appreciate that the subject system 100, components, and examples described above with respect to FIG. 1, FIG. 2, FIG. 3, FIG. 4, FIG. 5, FIG. 6, FIG. 7, FIG. 8, FIG. 9A-9C, FIG. 10A-10C, and FIG. 11A-11C will be better understood in conjunction with the methodologies described hereinafter with respect to FIG. 12, FIG. 13, and FIG. 14. Turning now to FIG. 12, there is shown a flowchart 1200 illustrating a method for image fog scene detection in accordance with one embodiment of the subject application. Beginning at step 1202, electronic image data is received by the document processing device 104. It will be appreciated by those skilled in the art that reference is made herein to the document processing device 104 implementing the methodology of FIG. 12 for example purposes only, and the skilled artisan will appreciate that other devices, such as the user device 114, are capable of implementing such methodology.

The received electronic image data is then divided, at step 1204, into a plurality of image regions, each region comprising a plurality of pixels. Suitable examples of such a division of an image into a plurality of regions are shown in FIG. 6, discussed in greater detail above. At step 1206, a comparison matrix is generated corresponding to each image region in accordance with a comparison of minimum intensity values associated with corresponding pixels to a threshold value. An entry of at least one comparison matrix is then tested, at step 1208, for a preselected value. An identification is then made at step 1210 corresponding to the identifying of the image as inclusive of a fog scene based upon the output of the test, performed at step 1208, on the entry of the comparison matrix. Fog scene detection data is then generated at step 1212 representing an identified fog scene in accordance with the identification made at step 1210.

Figure 13:
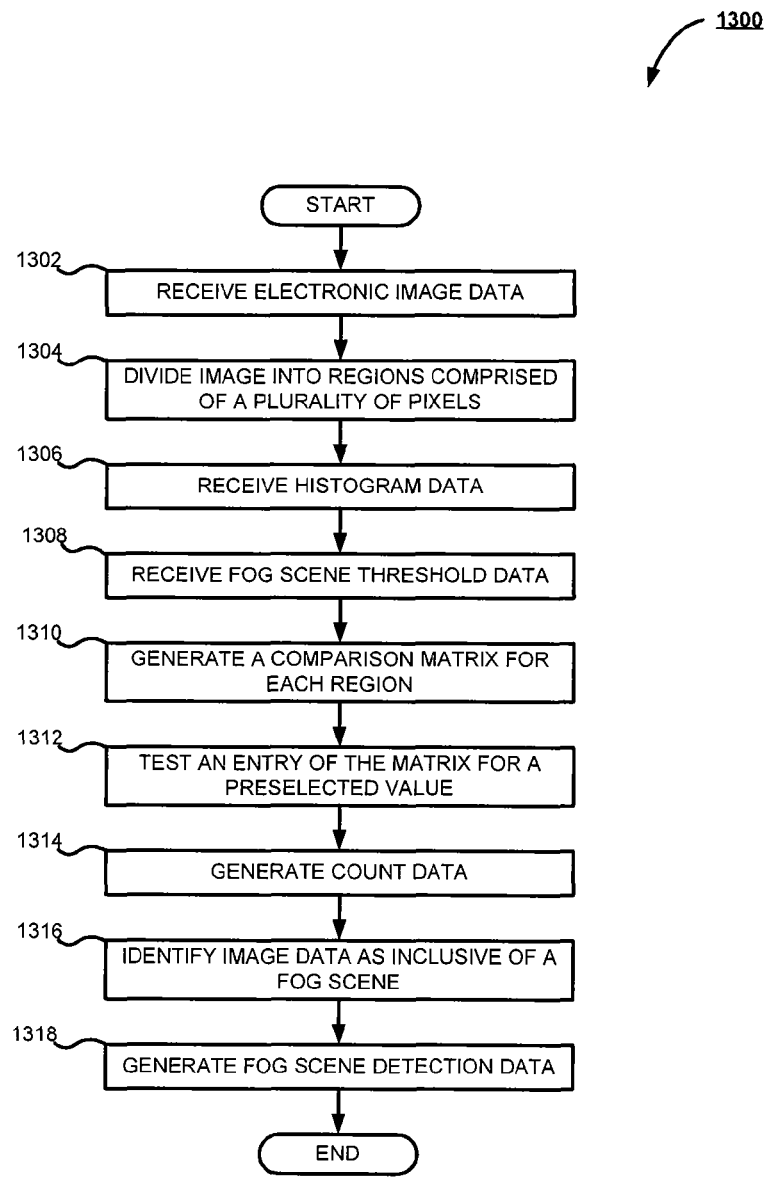
FIG. 13 is a flowchart illustrating a method for image fog scene detection according to one embodiment of the subject application.

Referring now to FIG. 13, there is shown a flowchart 1300 illustrating a method for image fog scene detection in accordance with one embodiment of the subject application. The methodology described in FIG. 13 begins at step 1302, whereupon electronic image data, such as the image data illustrated in FIGS. 4, 6, 9A, 10A, and 11A, is received by the controller 108 or other suitable component associated with the document processing device 104. While reference is made with respect to FIG. 13 as the document processing device 104 performing the operations described hereinafter, the skilled artisan will appreciate that the user device 114, or other suitable electronic computing device is capable of being used in accordance with the subject application.

At step 1304, the received electronic image data is then divided into a plurality of image regions. Each of the image regions includes a corresponding plurality of pixels. FIG. 6, discussed in greater detail above, illustrates a suitable example of such a division of a received electronic image. Flow then proceeds to step 1306, whereupon the controller 108 or other suitable component associated with the document processing device 104 receives histogram data corresponding to data representative of fog scene characteristics. It will be appreciated by those skilled in the art that the histogram data, as illustrated in FIG. 4, includes data associated with minimum image component values, modified minimum image component values, or black point analysis on previously received image data, as explained in greater detail above.

Fog scene threshold data is then received at step 1308 by the controller 108 or other suitable component associated with the document processing device 104 corresponding to a desired threshold for fog scene detection. In accordance with one embodiment of the subject application, the threshold data corresponds, for example and without limitation to the output of a suitable image enhancement system. Such suitable image enhancement systems include, for example and without limitation, an automatic darkening system, a white balance adjustment system, and the like. At step 1310, the controller 108 or other suitable component associated with the document processing device 104 then generates a comparison matrix for each of the image regions in accordance with a comparison of minimum intensity values associated with corresponding pixels to the threshold value. According to one embodiment of the subject application, the comparison matrix is generated in accordance with a comparison of minimum intensity values according to the received histogram data. Suitable examples of such comparison matrices are illustrated in FIG. 8 discussed above and FIGS. 9C, 10C, and 11C, described in greater above.

Flow then progresses to step 1312, whereupon the controller 108 or other suitable component associated with the document processing device tests an entry of a comparison matrix for a preselected value. As set forth elsewhere, such preselected value is capable of corresponding to a 1 or 0, such as those illustrated in FIGS. 8, 9C, 10C, and 11C, the relevance of which are discussed above. The controller 108 then generates, at step 1314, count data corresponding to each comparison matrix inclusive of an entry which includes the preselected value. At step 1316, the received electronic image data is identified by the controller 108 or other suitable component associated with the document processing device 104 as inclusive of a fog scene based upon the results of the tested entry. In accordance with one embodiment of the subject application, the identification of the received electronic image as a fog scene image is made in accordance with the generated count data, as will be understood by those skilled in the art. Upon the identification of the received electronic image as a fog scene, the controller 108 or other suitable component associated with the document processing device 104 generates fog scene detection data representing an identified fog scene image at step 1318.

Figure 14:
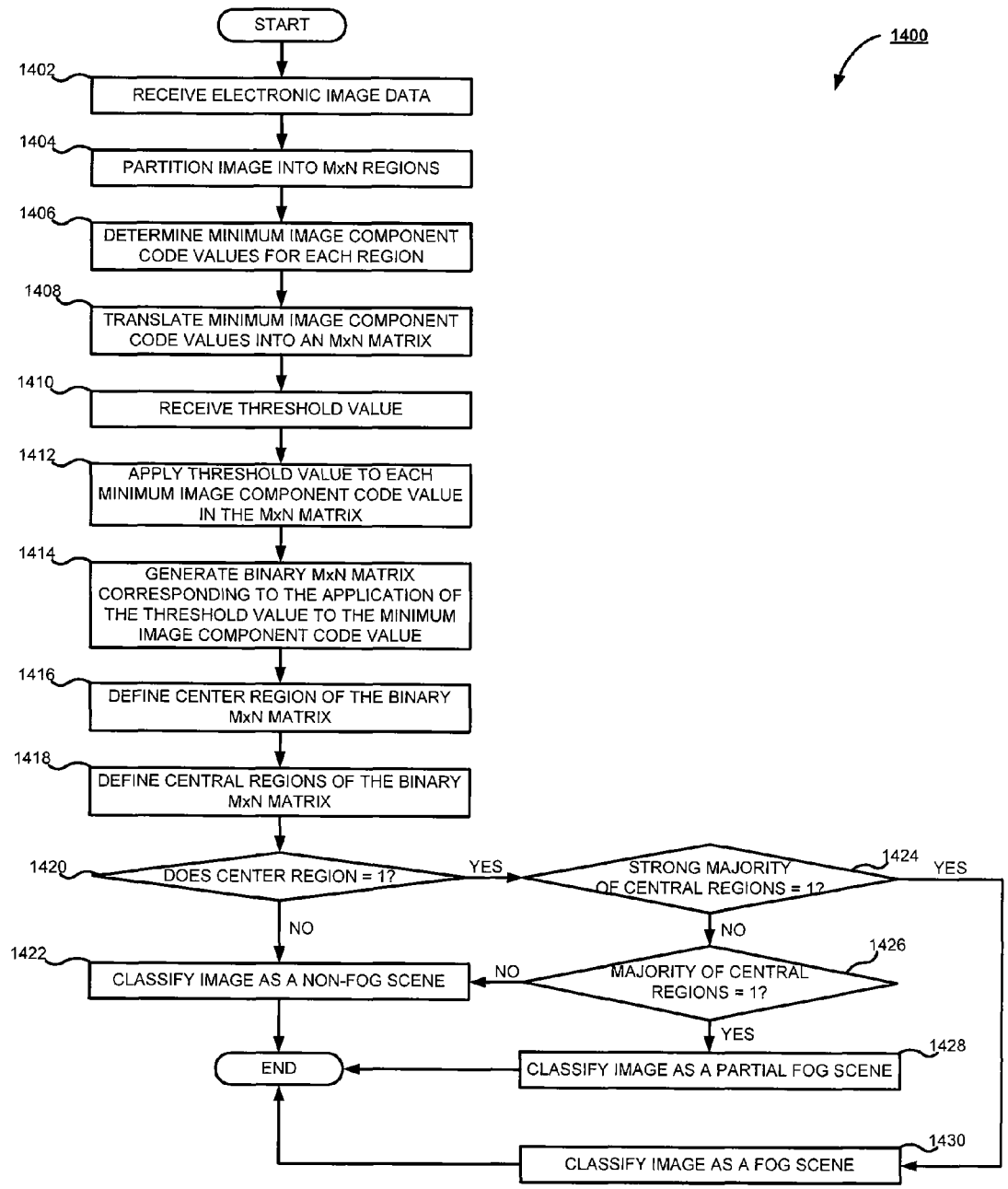
FIG. 14 is a flowchart illustrating a method for image fog scene detection according to one embodiment of the subject application.

Turning now to FIG. 14, there is shown a flowchart 1400 illustrating a method for image fog scene detection in accordance with one embodiment of the subject application. The method depicted in FIG. 14 begins at step 1402, whereupon image data is received by the document processing device 104 via any suitable means. It will be appreciated by those skilled in the art that the reasons set forth above with respect to the document processing device 104 implementing the method of FIG. 13 apply to FIG. 14 herein. Furthermore, the FIGS. 4, 6, 9A, 10A, and 11A are also applicable as representative of the images received by the document processing device 104 at step 1402.

At step 1404, the received electronic image data is partitioned into M×N image regions, as illustrated in the example partitioned image 600 of FIG. 6. At step 1406, minimum image component code values, e.g., minimum RGB code values, are determined for each region of the partitioned image by the controller 108 or other suitable component associated with the document processing device 104. The minimum image component code values are then translated at step 1408 into an M×N matrix, or a minimum code value chart. Examples of such a translation of minimum image component code values into a chart, or matrix, format are illustrated in FIGS. 7, 9B, 10B, and 11B corresponding to the implementation of the subject application to RGB input images, thus minimum RGB translation. Thus, FIG. 7 illustrates a suitable minimum code value chart 700 corresponding to the 5×5 regions of FIG. 6, resulting in a 5×5 chart, or matrix. The skilled artisan will appreciate that the minimum image component value method is used in FIG. 14 for example purposes only, and other methods of generating such code value charts are capable of being used including, for example and without limitation, modified minimum image component, black point analysis on previously received image data in any color or monochromatic space including, for example and without limitation, RGB, Grayscale, L*a*b*, XYZ, CMYK, Hi-Fi, and the like. Accordingly, reference is made with respect to the explanation of FIG. 14 to the image 600 of FIG. 6, the minimum RGB value code chart 700 of FIG. 7, and the binary code chart 800 of FIG. 8 for purposes of example only.

At step 1410, the controller 108 or other suitable component associated with the document processing device 104 then receives a threshold value for application to the minimum RGB code value matrix 700. In accordance with one embodiment of the subject application, the threshold value is obtained via an optimization process, as will be understood by those skilled in the art, including, for example and without limitation, by plotting the receiver operator characteristic curve, and the like. Other methods, including use of histogram data, output of an image enhancement system (white balance adjustment, automatic darkening, etc.), and the like, are also capable of being used to determine the threshold value.

The determined threshold value is then applied to the minimum image component code value M×N matrix 700 at step 1412 so as to generate a binary M×N matrix 800 at step 1414. In accordance with one example embodiment of the subject application, the minimum image component code values in the M×N matrix 700 greater than the threshold value are assigned a 1 and those code values in the M×N matrix 700 less than the threshold value are assigned a zero. Those skilled in the art will appreciate that those values equal to the threshold value are capable of either being assigned a 1 or a 0, depending upon settings selected by an associated user of the document processing device 104.

A center region 802 of the generated binary M×N matrix 800 is then defined by the controller 108 or other suitable component associated with the document processing device 104 at step 1416. Referring back to FIG. 6, the center region 604 of the image 600 corresponds to the defined center region 802 of the generated binary M×N matrix 800 of FIG. 8. The controller 108 or other suitable component associated with the document processing device 104 then defines the central regions 804 of the generated binary M×N matrix 800 at step 1418. As with the center region 802, the central regions 804 of FIG. 8 correspond to the central regions 606 of FIG. 6.

A determination is then made at step 1420 whether the center region 802 of the generated binary M×N matrix 800 has an applied threshold value of 1. When the center region 802 of the matrix 800 does not have a value of 1, (e.g., FIGS. 11A-11C), flow proceeds to step 1422, whereupon the associated image is classified as a non-fog scene image. When it is determined at step 1420 that the center region 802 of the generated binary M×N matrix 800 does have a threshold applied value of 1, flow proceeds to step 1424. At step 1424, a determination is made by the controller 108 or other suitable component associated with the document processing device 104 whether a strong majority of the central regions 804 of the generated binary M×N matrix 800 have threshold applied values of 1. In accordance with one embodiment of the subject application, a strong majority is defined by an associated user, for example and without limitation, 90% of the central regions having a threshold applied value of 1 are defined as a strong majority. It will be appreciated by those skilled in the art that the determination of a strong majority is capable of being altered by the user, based upon user desired settings in accordance with the subject application.

Upon a determination at step 1424 that a strong majority of the central regions 804 of the generated binary M×N matrix 800 associated with the received electronic image have threshold applied values of 1, flow proceeds to step 1430. At step 1430, the received electronic image is classified by the controller 108 or other suitable component associated with the document processing device 104 as a fog scene image. Returning to step 1424, when it is determined that a strong majority of the central regions 804 do not have threshold applied values of 1, flow progresses to step 1426. A determination is then made at step 1426 whether a majority of central regions 804 have threshold applied values of 1. It will be appreciated by those skilled in the art that the determination of a majority is capable of being selected by an associated user, e.g., a majority constitutes 60% of the central regions 804 having a threshold applied value of 1. Other percentages, depending upon user preferences, are capable of being used in accordance with the subject application.

When a majority of central regions 804 are determined to have threshold applied values of 1 at step 1426, flow proceeds to step 1428, whereupon the received image is classified as a partial fog scene image. When the controller 108 or other suitable component associated with the document processing device 104 determines at step 1426 that no majority of central regions 804 having threshold applied values of 1 is found in the binary M×N matrix 800, flow proceeds to step 1422, whereupon the image is classified as a non-fog scene image.

The skilled artisan will appreciate that while reference has been made above with respect to RGB image component code values, other color or monochromatic spaces are also capable of being subjected to the system and method of the subject application corresponding to fog scene detection, as will be understood by those skilled in the art. Suitable examples of such color or monochromatic spaces include, for example and without limitation, grayscale, L*a*b*, XYZ, YCC, CMYK, Hi-Fi, and the like.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed is:

1. An image fog scene detection system comprising:
   means for receiving electronic image data;
   segmentation means adapted for dividing received electronic image data into a plurality of image regions, each image region being comprised of a plurality of pixels;
   comparison means for generating a comparison matrix corresponding to each image region in accordance with a comparison of minimum intensity values associated with corresponding pixels to a threshold value;
   testing means for testing an entry of at least one comparison matrix for a preselected value;
   identifying means for identifying received electronic image data as inclusive of a fog scene in accordance with an output of the testing means; and
   means for generating fog scene detection data representative of an identified fog scene in accordance with an output of the identifying means.

2. The system of claim 1 wherein the testing means further comprises means for generating count data corresponding to each comparison matrix inclusive of an entry which includes the preselected value, and wherein the identifying means includes means adapted for identifying received electronic image data in accordance with generated count data.

3. The system of claim 2 further comprising means for receiving histogram data corresponding to a data representative of fog scene characteristics, and wherein the comparison means includes means adapted for generating each comparison matrix in accordance with a comparison of minimum intensity values in accordance with received histogram data.

4. The system of claim 3 wherein the histogram data includes data associated with at least one of minimum image component value, modified minimum image component value, and black point analysis on previously received image data.

5. The system of claim 1 further comprising means for receiving fog scene threshold data corresponding to a desired threshold for fog scene detection, and wherein the identifying means further includes means for identifying received electronic image data in accordance with received threshold data.

6. The system of claim 5 wherein the threshold data corresponds to an output of an associated image enhancement system.

7. The system of claim 6 wherein the associated image enhancement system is at least one of a white balance adjustment system and an automatic darkening system.

8. A method for image fog scene detection comprising:
receiving electronic image data;
dividing received electronic image data into a plurality of image regions, each image region being comprised of a plurality of pixels;
generating a comparison matrix, using a processor and associated memory, corresponding to each image region in accordance with a comparison of minimum intensity values associated with corresponding pixels to a threshold value;
testing an entry of at least one comparison matrix for a preselected value;
identifying received electronic image data as inclusive of a fog scene in accordance with the testing; and
generating fog scene detection data representative of an identified fog scene.

9. The method of claim 8 further comprises generating count data corresponding to each comparison matrix inclusive of an entry which includes the preselected value, and wherein identifying received electronic image data is in accordance with generated count data.

10. The method of claim 9 further comprising receiving histogram data corresponding to a data representative of fog scene characteristics, and wherein the step of generating a comparison matrix is in accordance with a comparison of minimum intensity values in accordance with received histogram data.

11. The method of claim 10 wherein the histogram data includes data associated with at least one of minimum image component value, modified minimum image component value, and black point analysis on previously received image data.

12. The method claim 8 further comprising receiving fog scene threshold data corresponding to a desired threshold for fog scene detection, and wherein identifying received electronic image data is in accordance with received threshold data.

13. The method of claim 12 wherein the threshold data corresponds to an output of an associated image enhancement system.

14. The method of claim 13 wherein the associated image enhancement system is at least one of a white balance adjustment system and an automatic darkening system.

15. Apparatus comprising a non-transitory storage medium storing a program having instructions which when executed by a processor will cause the processor to detect image fog, the instructions of the program for:
receiving electronic image data;
dividing received electronic image data into a plurality of image regions, each image region being comprised of a plurality of pixels;
generating a comparison matrix corresponding to each image region in accordance with a comparison of minimum intensity values associated with corresponding pixels to a threshold value;
testing an entry of at least one comparison matrix for a preselected value;
identifying received electronic image data as inclusive of a fog scene in accordance with the testing; and
generating fog scene detection data representative of an identified fog scene.

16. The apparatus of claim 15 wherein the instructions of the program are further for generating count data corresponding to each comparison matrix inclusive of an entry which includes the preselected value, and wherein identifying received electronic image data is in accordance with generated count data.

17. The apparatus of claim 16 wherein the instructions of the program are further for receiving histogram data corresponding to a data representative of fog scene characteristics, and wherein generating a comparison matrix is in accordance with a comparison of minimum intensity values in accordance with received histogram data.

18. The apparatus of claim 17 wherein the histogram data includes data associated with at least one of minimum RGB, modified minimum RGB, and black point analysis on previously received image data.

19. The apparatus of claim 15 wherein the instructions of the program are further for receiving fog scene threshold data corresponding to a desired threshold for fog scene detection, and wherein identifying received electronic image data is in accordance with received threshold data.

20. The apparatus of claim 19 wherein the threshold data corresponds to an output of an associated image enhancement system.

* * * * *